United States Patent
Luff

(10) Patent No.: US 9,383,618 B2
(45) Date of Patent: Jul. 5, 2016

(54) SEMICONDUCTOR STRUCTURES FOR ENHANCED TRANSIENT RESPONSE IN LOW DROPOUT (LDO) VOLTAGE REGULATORS

(71) Applicant: INTERSIL AMERICAS LLC, Milpitas, CA (US)

(72) Inventor: Gwilym Luff, Cambridge (GB)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 14/336,870

(22) Filed: Jul. 21, 2014

(65) Prior Publication Data
US 2015/0220096 A1 Aug. 6, 2015

Related U.S. Application Data

(60) Provisional application No. 61/946,268, filed on Feb. 28, 2014, provisional application No. 61/936,111, filed on Feb. 5, 2014.

(51) Int. Cl.
G05F 3/02 (2006.01)
G02F 1/1368 (2006.01)
G05F 1/56 (2006.01)

(52) U.S. Cl.
CPC .............. *G02F 1/1368* (2013.01); *G05F 1/56* (2013.01)

(58) Field of Classification Search
USPC ................... 323/270, 280–281, 313–316; 327/540–541, 543–544
See application file for complete search history.

(56) References Cited

U.S. PATENT DOCUMENTS 6,856,124 B2 * 2/2005 Dearn ................ G05F 1/575
 323/273
7,218,083 B2 * 5/2007 Wang ................. G05F 1/575
 323/273

(Continued)

OTHER PUBLICATIONS

Giustolisi et al, "Robust Miller Compensation With Current Amplifiers Applied to LDO Voltage Regulators", "IEEE Transactions on Circuits and Systems—I: Regular Papers", Sep. 2012, pp. 1880-1893, vol. 59, No. 9, Publisher: IEEE.

(Continued)

*Primary Examiner* — An Luu
(74) *Attorney, Agent, or Firm* — Fogg & Powers LLC

(57) ABSTRACT

Systems, semiconductor structures, electronic circuits and methods for enhanced transient response in Low Dropout (LDO) voltage regulators are disclosed. For example, a semiconductor structure for enhanced transient response in an LDO voltage regulator is disclosed, which includes a first current mirror circuit coupled to an input connection and an output connection of the LDO voltage regulator, a second current mirror circuit coupled to the input connection of the LDO voltage regulator. A first input of a first amplifier circuit is coupled to the second current mirror circuit, a second input of the first amplifier circuit is coupled to the output connection of the LDO voltage regulator, and a third input of the first amplifier circuit is coupled to a reference voltage. An input of a second amplifier circuit is coupled to an output of the first amplifier circuit, an output of the second amplifier circuit is coupled to the first current mirror circuit, an input of a third amplifier circuit is coupled to the output of the first amplifier circuit, and an output of the third amplifier circuit is coupled to the second current mirror circuit. In some implementations, the semiconductor structure is an adaptively-biased LDO voltage regulator formed in a power management integrated circuit (PMIC) or in a power supply on a semiconductor IC, wafer, chip or die.

31 Claims, 8 Drawing Sheets

(56) References Cited

U.S. PATENT DOCUMENTS

| | | | | |
|---|---|---|---|---|
| 8,716,993 | B2* | 5/2014 | Kadanka | G05F 1/56 323/274 |
| 8,917,069 | B2* | 12/2014 | Howes | G05F 1/575 323/266 |
| 2002/0171403 | A1* | 11/2002 | Lopata | H03F 3/45183 323/280 |
| 2013/0147448 | A1 | 6/2013 | Kadanka | |

OTHER PUBLICATIONS

"High Efficiency Power Supply for Small Size Displays", Mar. 8, 2013, pp. 1-22, Publisher: Intersil.

"TFT-LCD Supply+DCP+VCOM Amplifier+Gate Pulse Modulator+Reset", Nov. 28, 2011, pp. 1-39, Publisher: Intersil.

Lam et al, "A 0.9V 0.35um Adaptively Biased CMOS LDO Regulator with Fast Transient Response", "2008 IEEE International Solid-State Circuits Conference", Feb. 6, 2008, pp. 442-443 and 626.

Mangelsdorf, "A Little in Front O' The Next", "IEEE Solid-State Circuits Magazine", Summer 2013, pp. 29-34, Publisher: IEEE.

Plankensteiner et al, "Optimization of hardware resources in handheld devices leads to effective power management Part 1", "Retrieved Jul. 18, 2014 from http://www.eetimes.com/document.asp?doc_id=1230736&", Apr. 7, 2004, pp. 1-6.

Stanescu, "A New Circuit Technique for Improving Transient Load Regulation in Low-Voltage CMOS LDOS", 2012, pp. 373-376.

\* cited by examiner

US 9,383,618 B2

SEMICONDUCTOR STRUCTURES FOR ENHANCED TRANSIENT RESPONSE IN LOW DROPOUT (LDO) VOLTAGE REGULATORS

CROSS-REFERENCE TO RELATED APPLICATIONS

This application is related to U.S. Provisional Patent Application Ser. No. 61/936,111 entitled "SEMICONDUCTOR STRUCTURES FOR ENHANCED TRANSIENT RESPONSE IN LOW DROPOUT (LDO) VOLTAGE REGULATORS," filed on Feb. 5, 2014 and incorporated herein by reference. This application is also related to U.S. Provisional Patent Application Ser. No. 61/946,268 entitled "SEMICONDUCTOR STRUCTURES FOR ENHANCED TRANSIENT RESPONSE IN LOW DROPOUT (LDO) VOLTAGE REGULATORS," filed on Feb. 28, 2014 and incorporated herein by reference. This application hereby claims to the benefit of U.S. Provisional Patent Application Ser. Nos. 61/936,111 and 61/946,268.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings.

DETAILED DESCRIPTION

Figure 1:
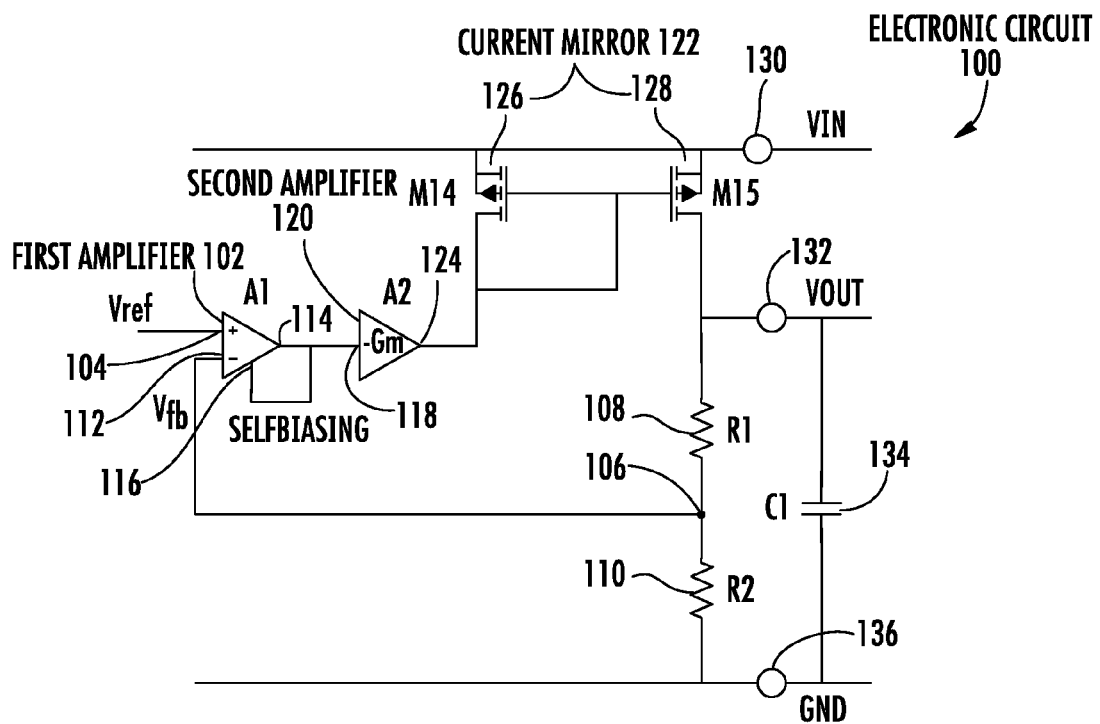
FIG. 1 is a schematic block diagram of an electronic circuit, which can be utilized to implement one exemplary embodiment of the present invention.

In the following detailed description, reference is made to the accompanying drawings that form a part hereof, and in which are shown by way of specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be construed in a limiting sense. Wherever possible, the same or like reference numbers are used throughout the drawings to refer to the same or like structural components or parts.

Embodiments described herein provide semiconductor structures for enhanced transient response in Low Dropout (LDO) voltage regulators. For one example embodiment, a semiconductor structure includes an LDO voltage regulator with an adaptively-biased input stage. The adaptive bias signal is a feedback signal coupled from the output of the input stage (e.g., first gain stage) to an input of that stage. As a result, the transient response of the resulting adaptive bias feedback loop is significantly faster than the transient response of the LDO voltage regulator's main feedback loop. More precisely, the drive current to the output stage of the LDO voltage regulator is increased at a significantly higher rate than that of the output current in order to charge the gate capacitance of the pass transistor device. Consequently, the load transient induced output voltage dips of the adaptively-biased LDO voltage regulator are significantly smaller than the output voltage dips of conventional LDO voltage regulators (e.g., if relatively small output capacitors are utilized).

Embodiments of the present semiconductor structure for enhanced transient response can be formed, for example, in a semiconductor integrated circuit (IC), wafer, chip or die. Therefore, for example, the semiconductor structure can be utilized as an LDO voltage regulator in, or in conjunction with, an IC power supply or power management IC (PMIC). For example, such IC powers supplies or PMICs can be utilized in products requiring high value, low equivalent-series-resistance (ESR) capacitive loads and enhanced power supply rejection ratio (PSRR) performance. As such, for example, the present semiconductor structure for enhanced transient response can be utilized in IC power supplies or PMICs for smart phones or similar products, which utilize relatively large (µF range), low ESR ceramic capacitors for power supply decoupling. Also, certain products may require such semiconductor ICs embodied as LDO voltage regulators with suitable transient responses for relatively low output capacitances, because such LDO regulators that supply digital circuits often experience sudden increases in load current. Consequently, the resulting output voltage dips of the LDO voltage regulators should be minimized (e.g., 10 mV to 30 mV) to retain suitable circuit performance of the LDO voltage regulators at low voltages. As such, the present semiconductor structure for enhanced transient response readily meets such performance requirements as a result of taking the adaptive bias feedback from the output of the first gain stage in the LDO voltage regulator so that the adaptive bias feedback loop is not limited in bandwidth by the large gate capacitance of the pass transistor device as it is so limited in conventional LDO voltage regulators.

FIG. 1 is a schematic block diagram of an electronic circuit 100, which can be utilized to implement one exemplary embodiment of the present invention. For example, electronic circuit 100 can be utilized to implement an adaptively-biased LDO voltage regulator for enhanced transient response in a semiconductor structure, such as, for example, a semiconductor integrated circuit (IC), wafer, chip or die.

Referring to the exemplary embodiment shown in FIG. 1, electronic circuit 100 (e.g., LDO voltage regulator) includes a first amplifier 102, which is an input stage that also functions as an error amplifier in circuit 100. In this exemplary embodiment, first amplifier 102 is a voltage gain amplifier with its current bias level controlled by its output voltage (e.g., self-biasing amplifier). A first input voltage (e.g., reference voltage or Vref) is coupled to the non-inverting input 104 of first amplifier 102. In some embodiments, the first input voltage is a fixed, reference voltage generated within the electronic circuit 100. In other embodiments, the first input voltage is a variable reference voltage (e.g., varied by a digital to analog converter). In some embodiments, the first input voltage is generated externally to the electronic circuit 100 and coupled to the input 104, for example, through a pin of a semiconductor IC or chip. A second input voltage (e.g., feedback voltage or Vfb) is coupled from a node 106 connected to a first resistor 108 and a second resistor 110 (e.g., a resistive voltage divider) to the inverting input 112 of first amplifier 102, and the output voltage of first amplifier 102 is coupled from the output 114 of the first amplifier 102 back to the bias current control input 116 of the first amplifier 102 (i.e., self-biasing) and also to the input 118 of a second amplifier 120. In this exemplary embodiment, second amplifier 120 is an inverting transconductance amplifier, which develops the drive current for a current mirror output stage 122. More precisely, the output 124 of the second amplifier 120 is coupled to the gate terminal and drain terminal of a first transistor device 126 of the current mirror output stage 122, and also to the gate terminal of a second transistor device 128 of the current mirror output stage 122. The source terminals of the first transistor device 126 and second transistor device 128 are coupled to an input terminal 130 (e.g., $V_{IN}$) of the electronic circuit 100. The drain terminal of the second transistor device 128 is coupled to one side (e.g., opposite to that of node 106) of the first resistor 108 and an output terminal 132 (e.g., $V_{OUT}$) of the electronic circuit 100. One side of a capacitor 134 (e.g., output capacitor) is coupled to the output terminal 132, and the opposite side of the capacitor 134 is coupled to a ground terminal 136 (e.g., GND or circuit ground) of the electronic circuit 100. The second side (e.g., opposite to that of node 106) of the second resistor 110 is also coupled to the ground terminal 136.

In this exemplary embodiment, the output current for electronic circuit 100 is generated by the second (mirror) transistor device 128, which is typically a large pass transistor device with a total gate area or width that can be approximately 50 to 500 times larger than the total gate area or width of the first (mirror) transistor device 126. In other words, the current mirror 122 formed by the first transistor device 126 and the second transistor device 128, may have a relatively high pass ratio compared to other, conventional current mirror stages. Frequency compensation for the electronic circuit 100 is provided by the output capacitor 134, which creates the dominant frequency pole in electronic circuit 100. The frequency of the pole created by the gate capacitance of the second (mirror) transistor device 128 is increased by the first mirror transistor device 126. Notably, a frequency pole is also created at the output 114 of the first amplifier 102 due to the capacitance at the output 114. However, the output impedance (and hence the voltage gain) of the first amplifier 102 is suitably reduced by design choices to make this pole non-dominant. Also, it is useful to note at this point that all of the transistor devices described herein can be implemented, for example, with p-channel metal-oxide semiconductor (PMOS) or n-channel MOS (NMOS) transistor devices depending on design or manufacturing preferences. It should be noted that in some embodiments, the first (mirror) transistor device 126 is not used, hence no output current mirror (122) is utilized and the output stage substantially consists of output transistor 128.

Figure 2:
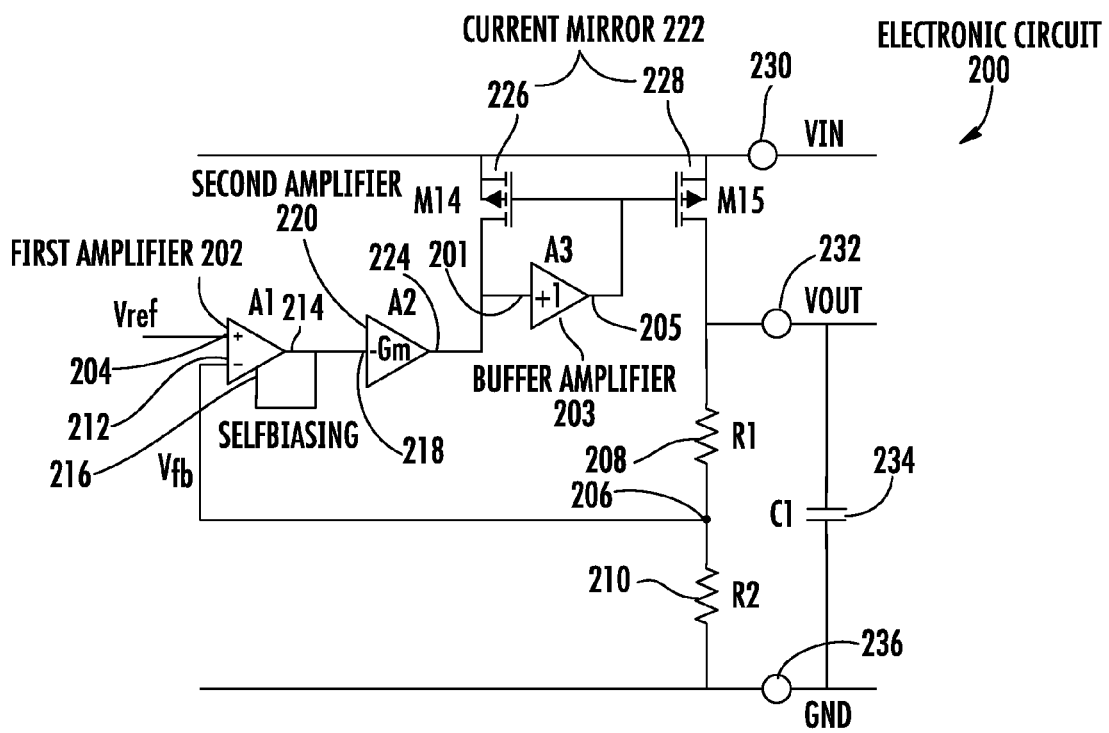
FIG. 2 is a schematic block diagram of a second electronic circuit, which can be utilized to implement a second exemplary embodiment of the present invention.

FIG. 2 is a schematic block diagram of a second electronic circuit 200, which can be utilized to implement a second exemplary embodiment of the present invention. For example, electronic circuit 200 can be utilized to implement a second adaptively-biased LDO voltage regulator for enhanced transient response in a semiconductor structure, such as, for example, a semiconductor IC, wafer, chip or die.

Referring to the exemplary embodiment shown in FIG. 2, electronic circuit 200 (e.g., LDO voltage regulator) includes a first amplifier 202, which is an input stage that also functions as an error amplifier in circuit 200. In this exemplary embodiment, first amplifier 202 is a voltage gain amplifier with its current bias level controlled by its output voltage (e.g., self-biasing amplifier). A first input voltage (e.g., reference voltage or Vref) is coupled to the non-inverting input 204 of first amplifier 202. In some embodiments, the first input voltage is a fixed, reference voltage generated within the electronic circuit 200. In other embodiments, the first input voltage is a variable reference voltage (e.g., varied by a digital to analog converter). In some embodiments, the first input voltage is generated externally to the electronic circuit 200 and coupled to the input 204, for example, through a pin of a semiconductor IC or chip. A second input voltage (e.g., feedback voltage or Vfb) is coupled from a node 206 connected to a first resistor 208 and a second resistor 210 (e.g., a resistive voltage divider) to the inverting input 212 of first amplifier 202, and the output voltage of first amplifier 202 is coupled from the output 214 of the first amplifier 202 back to the bias current control input 216 of the first amplifier 202 (i.e., self-biasing) and also to the input 218 of a second amplifier 220. In this exemplary embodiment, second amplifier 220 is an inverting transconductance amplifier, which develops the drive current for a current mirror output stage 222. More precisely, the output 224 of the second amplifier 220 is coupled to the drain terminal of a first transistor device 226 of the current mirror output stage 222 and also to the input 201 of a third (e.g., buffer) amplifier 203. The output 205 of the third amplifier 203 is coupled to the gate terminal of the first transistor device 226 and also to the gate terminal of a second transistor device 228 of the current mirror output stage 222.

In this exemplary embodiment, the output current for electronic circuit 200 is generated by the second (mirror) transistor device 228 of the current mirror output stage 222. The second transistor device 228 is typically a large pass transistor device with a total gate area or width that can be approximately 50 to 500 times larger than the total gate area or width of the first (mirror) transistor device 226. Notably, in the exemplary embodiment shown, the combination of the third amplifier 203 coupled between the output 224 of the second amplifier 220 and the gate terminals of the first and second transistor devices 226, 228 forms a buffered, current mirror output stage 222. In other words, the third amplifier 203 functions, for example, as a buffer amplifier or voltage follower to drive the relatively large gate capacitance of the second transistor device 228 of the current mirror output stage 222. Consequently, the third amplifier 203 is utilized to increase the overall bandwidth of the current mirror output stage 222 over that of the current mirror output stage 122 of electronic circuit 100. However, this enhancement may be offset slightly by the slightly higher current consumption in electronic circuit 200 over that of electronic circuit 100 because of the additional circuit component utilized.

The source terminals of the first transistor device 226 and second transistor device 228 are coupled to an input terminal 230 (e.g., $V_{IN}$) of the electronic circuit 200. The drain terminal of the second transistor device 228 is coupled to one side (e.g., opposite to that of node 206) of the first resistor 208 and an output terminal 232 (e.g., $V_{OUT}$) of the electronic circuit 200. One side of a capacitor 234 (e.g., output capacitor) is coupled to the output terminal 232, and the opposite side of the capacitor 234 is coupled to a ground terminal 236 (e.g., GND or circuit ground) of the electronic circuit 200. The second side (e.g., opposite to that of node 206) of the second resistor 210 is also coupled to the ground terminal 236.

Figure 3:
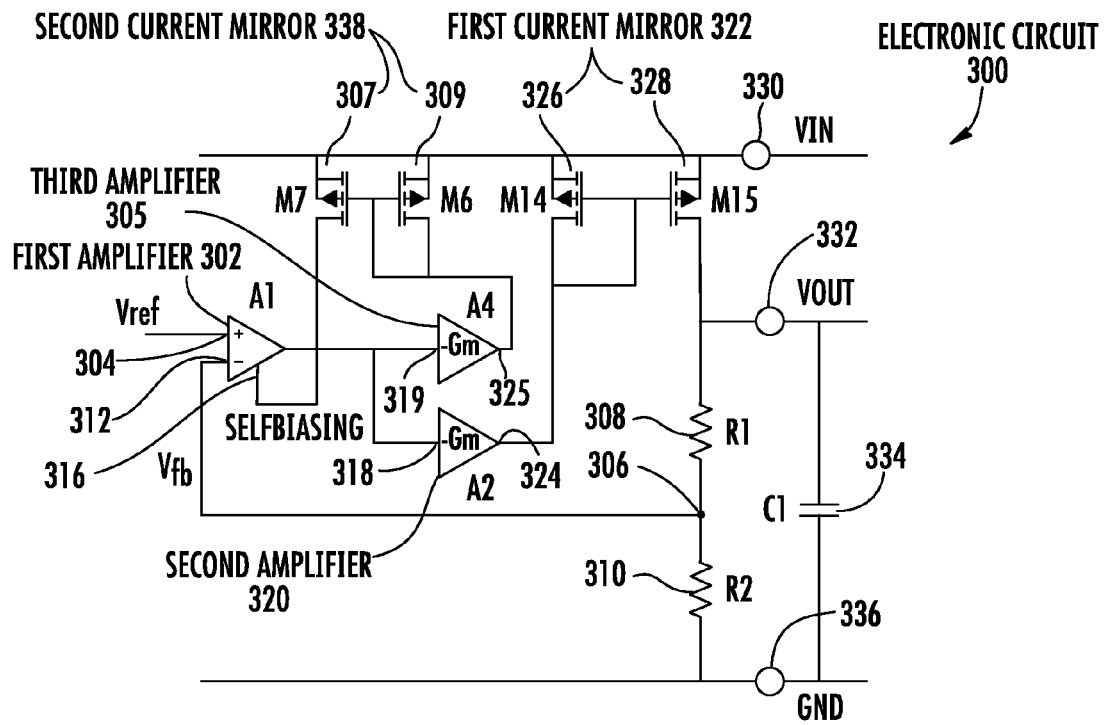
FIG. 3 is a schematic block diagram of a third electronic circuit, which can be utilized to implement a third exemplary embodiment of the present invention.

FIG. 3 is a schematic block diagram of a third electronic circuit 300, which can be utilized to implement a third exemplary embodiment of the present invention. For example, electronic circuit 300 can be utilized to implement a third adaptively-biased LDO voltage regulator for enhanced transient response in a semiconductor structure, such as, for example, a semiconductor IC, wafer, chip or die.

Referring to the exemplary embodiment shown in FIG. 3, electronic circuit 300 (e.g., LDO voltage regulator) includes a first amplifier 302, which is an input stage that also functions as an error amplifier in circuit 300. In this exemplary embodiment, first amplifier 302 is a voltage gain amplifier with its current bias level controlled by its output voltage (e.g., self-biasing amplifier). A first input voltage (e.g., reference voltage or Vref) is coupled to the non-inverting input 304 of first amplifier 302. In some embodiments, the first input voltage is a fixed, reference voltage generated within the electronic circuit 300. In other embodiments, the first input voltage is a variable reference voltage (e.g., varied by a digital to analog converter). In some embodiments, the first input voltage is generated externally to the electronic circuit 300 and coupled to the input 304, for example, through a pin of a semiconductor IC or chip. A second input voltage (e.g., feedback voltage or Vfb) is coupled from a node 306 connected to a first resistor 308 and a second resistor 310 (e.g., a resistive voltage divider) to the inverting input 312 of first amplifier 302, and the output voltage of first amplifier 302 is coupled from the output 314 of the first amplifier 302 to the input 318 of a second amplifier 320 and also to the input 319 of a third amplifier 305. In this exemplary embodiment, second amplifier 320 is an inverting transconductance amplifier, which develops the drive current for a first current mirror output stage 322. More precisely, the output 324 of the second amplifier 320 is coupled to the gate terminal and drain terminal of a first transistor device 326 of the first current mirror output stage 322, and also to the gate terminal of a second transistor device 328 of the first current mirror output stage 322. The source terminals of the first transistor device 326 and second transistor device 328 are coupled to an input terminal 330 (e.g., $V_{IN}$) of the electronic circuit 300. The drain terminal of the second transistor device 328 is coupled to one side (e.g., opposite to that of node 306) of the first resistor 308 and an output terminal 332 (e.g., $V_{OUT}$) of the electronic circuit 300. One side of a capacitor 334 (e.g., output capacitor) is coupled to the output terminal 332, and the opposite side of the capacitor 334 is coupled to a ground terminal 336 (e.g., GND or circuit ground) of the electronic circuit 300. The second side (e.g., opposite to that of node 306) of the second resistor 310 is also coupled to the ground terminal 336.

In this exemplary embodiment, the output current for electronic circuit 300 is generated by the second transistor device 328, which is typically a large pass transistor device with a total gate area or width that can be approximately 50 to 500 times larger than the total gate area or width of the first transistor device 326. In other words, the first current mirror 322 formed by the first transistor device 326 and the second transistor device 328, may have a relatively high pass ratio compared to other, conventional current mirror stages.

In this exemplary embodiment, the third amplifier 305 is also an inverting transconductance stage, which functions similarly to that of the second amplifier 320. The output 325 of the third amplifier 305 is coupled to the gate terminal of a third transistor device 307 of a second current mirror stage 338, and also to the gate terminal and drain terminal of a fourth transistor device 309 of the second current mirror stage 338. The drain terminal of the third transistor device 307 is coupled to the bias current input 316 of the first amplifier 302. Thus, the third amplifier 305 provides a bias current through the third and fourth transistor devices 307, 309 of the second current mirror stage 338 to the bias current input 316 of the first amplifier 302, and that bias current is proportional to the current supplied by the second amplifier 320 to the first transistor device 326 and second transistor device 328 of the first current mirror output stage 322. The proportional value is a design parameter that can be set by adjusting the transconductance value of the second amplifier 320 and the mirror ratio between the third mirror transistor device 307 and the fourth transistor device 309 of the second current mirror stage 338. It should be noted that the transconductance value of transconductance amplifiers 320 and 305 may be different, and the size of the transistors of the second current mirror stage 338 can be much smaller than the size of the transistors of the first current mirror stage 322.

Figure 4:
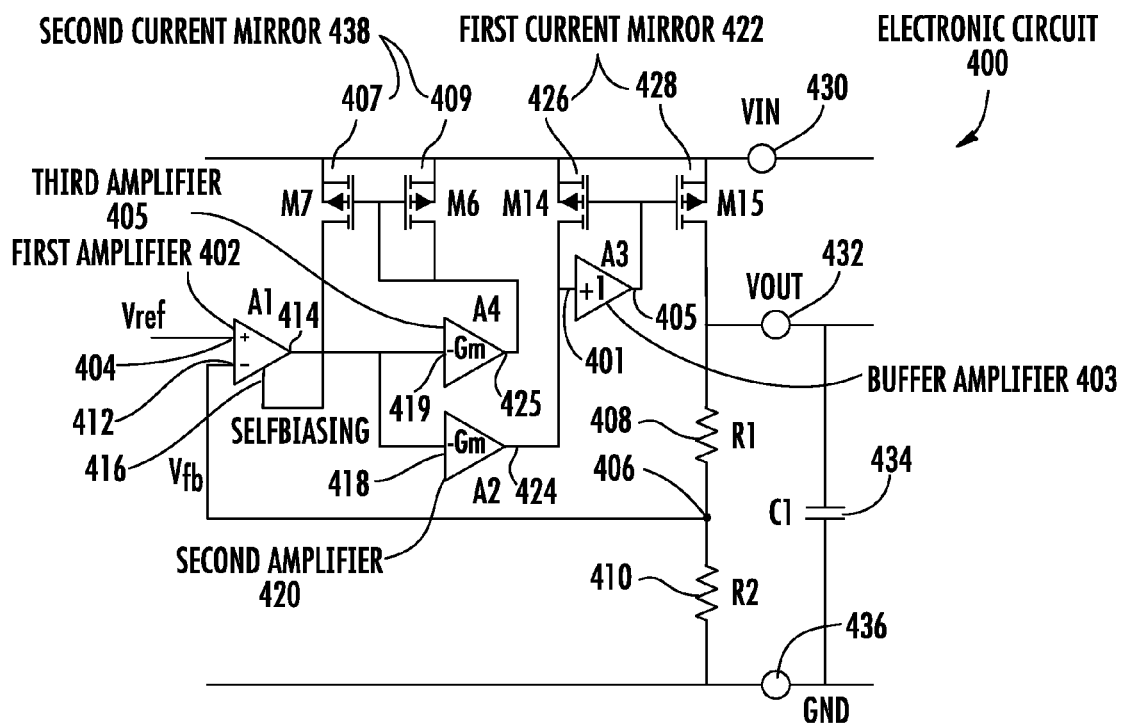
FIG. 4 is a schematic block diagram of a fourth electronic circuit, which can be utilized to implement a fourth exemplary embodiment of the present invention.

FIG. 4 is a schematic block diagram of a fourth electronic circuit 400, which can be utilized to implement a fourth exemplary embodiment of the present invention. For example, electronic circuit 400 can be utilized to implement a fourth adaptively-biased LDO voltage regulator for enhanced transient response in a semiconductor structure, such as, for example, a semiconductor IC, wafer, chip or die.

Referring to the exemplary embodiment shown in FIG. 4, electronic circuit 400 (e.g., LDO voltage regulator) includes a first amplifier 402, which is an input stage that also functions as an error amplifier in circuit 400. In this exemplary embodiment, first amplifier 402 is a voltage gain amplifier with its current bias level controlled by its output voltage (e.g., self-biasing amplifier). A first input voltage (e.g., reference voltage or Vref) is coupled to the non-inverting input 404 of first amplifier 402. In some embodiments, the first input voltage is a fixed, reference voltage generated within the electronic circuit 400. In other embodiments, the first input voltage is a variable reference voltage (e.g., varied by a digital to analog converter). In some embodiments, the first input voltage is generated externally to the electronic circuit 400 and coupled to the input 404, for example, through a pin of a semiconductor IC or chip. A second input voltage (e.g., feedback voltage or Vfb) is coupled from a node 406 connected to a first resistor 408 and a second resistor 410 (e.g., a resistive voltage divider) to the inverting input 412 of first amplifier 402, and the output voltage of first amplifier 402 is coupled from the output 414 of the first amplifier 402 to the input 418 of a second amplifier 420 and also to the input 419 of a third amplifier 405. In this exemplary embodiment, second amplifier 420 is an inverting transconductance amplifier, which develops the drive current for a first current mirror output stage 422. More precisely, the output 424 of the second amplifier 420 is coupled to the drain terminal of a first transistor device 426 and also to the input 401 of a buffer amplifier 403. The output 405 of the buffer amplifier 403 is coupled to the gate terminal of the first transistor device 426 and also to the gate terminal of a second transistor device 428 of the first current mirror output stage 422. The source terminals of the first transistor device 426 and second transistor device 428 are coupled to an input terminal 430 (e.g., $V_{IN}$) of the electronic circuit 400. The drain terminal of the second transistor device 428 is coupled to one side (e.g., opposite to that of node 406) of the first resistor 408 and an output terminal 432 (e.g., $V_{OUT}$) of the electronic circuit 400. One side of a capacitor 434 (e.g., output capacitor) is coupled to the output terminal 432, and the opposite side of the capacitor 434 is coupled to a ground terminal 436 (e.g., GND or circuit ground) of the electronic circuit 400. The second side (e.g., opposite to that of node 406) of the second resistor 410 is also coupled to the ground terminal 436.

In this exemplary embodiment, the output current for electronic circuit 400 is generated by the second transistor device 428 of the first current mirror output stage 422. The second transistor device 428 is typically a large pass transistor device with a total gate area or width that can be approximately 50 to 500 times larger than the total gate area or width of the first transistor device 426. In other words, the first current mirror 422 formed by the first transistor device 426 and the second transistor device 428, may have a relatively high pass ratio compared to other, conventional current mirror stages.

In this exemplary embodiment, the third amplifier 405 is also an inverting transconductance stage, which functions similarly to that of the second amplifier 420. The output 425 of the third amplifier 405 is coupled to the gate terminal of a third transistor device 407 of a second current mirror stage 438, and also to the gate terminal and source terminal of a fourth transistor device 409 of the second current mirror stage 438. The drain terminal of the third transistor device 407 is coupled to the bias current input 416 of the first amplifier 402. Thus, the third amplifier 405 provides a bias current through the third and fourth transistor devices 407, 409 of the second current mirror stage 438 to the bias current input 416 of the first amplifier 402, and that bias current is proportional to the current supplied by the second amplifier 420 to the first transistor device 426 and second transistor device 428 of the first current mirror output stage 422. The proportional value is a design parameter that can be set by adjusting the transconductance value of the second amplifier 420 and the mirror ratio between the third transistor device 407 and the fourth transistor device 409 of the second current mirror stage 438.

Notably, in the exemplary embodiment shown, the combination of the buffer amplifier 403 coupled between the output 424 of the second amplifier 420 and the gate terminals of the first and second transistor devices, 426, 428 functions to form a buffered, current mirror output stage 422. In other words, the buffer amplifier 403 functions, for example, as a buffer amplifier or voltage follower to drive the relatively large gate capacitance of the second transistor device 428 of the first current mirror stage 422. Consequently, the buffer amplifier 403 is utilized to increase the overall bandwidth of the current mirror output stage 422 over that of the current mirror output stage 322 of electronic circuit 300. It should be noted that the transconductance value of transconductance amplifiers 420 and 405 may be different, and the size of the transistors of the second current mirror stage 438 can be much smaller than the size of the transistors of the first current mirror stage 422.

Figure 5:
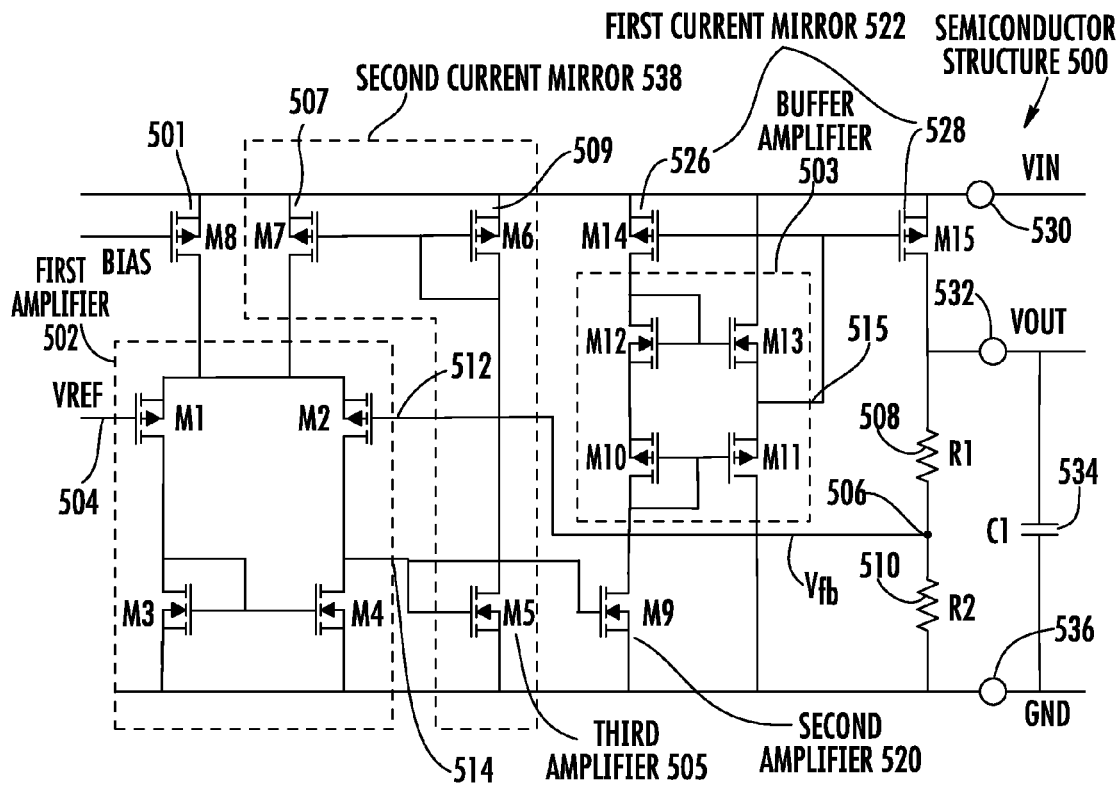
FIG. 5 is a schematic circuit diagram of an exemplary semiconductor structure, which can be utilized to implement the electronic circuit depicted in FIG. 2 or the electronic circuit depicted in FIG. 4.

FIG. 5 is a schematic circuit diagram of an exemplary semiconductor structure 500, which includes an electronic circuit that can be utilized to implement electronic circuit 200 or electronic circuit 400 (e.g., as an adaptively-biased LDO voltage regulator for enhanced transient response). For example, semiconductor structure 500 can be a semiconductor IC, wafer, chip or die. In this embodiment, a buffer amplifier is included in circuit 500 to produce, for example, a buffered current mirror output stage such as the buffered current mirror output stages 222, 422 shown in FIGS. 2 and 4.

Referring to the exemplary embodiment shown in FIG. 5 (and, for example, comparing the structure in FIG. 5 with the structures shown in FIGS. 2 and 4), semiconductor structure 500 includes a first amplifier 502 (e.g., indicated by the dashed lines including transistors M1-M4), which is an input stage that also functions as an error amplifier. In this exemplary embodiment, first amplifier 502 is a voltage gain amplifier with its current bias level controlled by its output voltage (e.g., self-biasing amplifier). A transistor 501 is coupled to the first amplifier 502, and responsive to an input voltage (e.g., BIAS) coupled to the gate terminal of the transistor 501, the transistor 501 generates a fixed bias current and thus provides a baseline bias current for the first amplifier 502, for example, at light load. In some embodiments, the input voltage (BIAS) is a fixed voltage generated within the semiconductor structure 500. In other embodiments, the input voltage (BIAS) is a variable reference voltage (e.g., varied by a digital to analog converter). In some embodiments, the input voltage (BIAS) is generated externally to the semiconductor structure 500 and coupled to the gate terminal of the transistor 501 through, for example, a pin of a semiconductor IC or chip.

A first input voltage (e.g., reference voltage or Vref) is coupled to the non-inverting input 504 (gate of transistor M1) of first amplifier 502. In some embodiments, the first input voltage is a fixed, reference voltage generated within the semiconductor structure 500. In other embodiments, the first input voltage is generated externally to the semiconductor structure 500 and coupled to the input 504, for example, through a pin of a semiconductor IC or chip. A second input voltage (e.g., feedback voltage or Vfb) is coupled from a node 506 connected to a first resistor 508 and a second resistor 510 (e.g., a resistive voltage divider) to the inverting input 512 (gate of transistor M2) of first amplifier 502. The output voltage of first amplifier 502 is coupled from the output 514 of the first amplifier 502 to the gate terminal (input) of a second amplifier 520 (transistor M9) and also to the gate terminal (input) of a third amplifier 505 (transistor M5).

In this exemplary embodiment, second amplifier 520 is an inverting transconductance amplifier, which develops the drive current for a first current mirror output stage 522. More precisely, the output (drain terminal) of the second amplifier 520 is coupled to the input of a buffer amplifier 503 (e.g., indicated by the dashed lines including transistors M10-M13) and also to the drain terminal of a first transistor device 526 (via diode connected transistors M10, M12). The output 515 of the buffer amplifier 503 is coupled to the gate terminal of the first transistor device 526 and also to the gate terminal of a second transistor device 528 of the first current mirror output stage 522. The source terminals of the first transistor device 526 and second transistor device 528 are coupled to an input terminal 530 (e.g., $V_{IN}$) of the semiconductor structure 500. The drain terminal of the second transistor device 528 is coupled to one side (e.g., opposite to that of node 506) of the first resistor 508 and an output terminal 532 (e.g., $V_{OUT}$) of the semiconductor structure 500. One side of a capacitor 534 (e.g., output capacitor) is coupled to the output terminal 532, and the opposite side of the capacitor 534 is coupled to a ground terminal 536 (e.g., GND or circuit ground) of the semiconductor structure 500. The second side (e.g., opposite to that of node 506) of the second resistor 510 is also coupled to the ground terminal 536.

In this exemplary embodiment, the output current for semiconductor structure 500 is generated by the second transistor device 528 of the first current mirror output stage 522. The second transistor device 528 is typically a large pass transistor device with a total gate area or width that can be approximately 50 to 500 times larger than the total gate area or width of the first transistor device 526. In other words, the first current mirror 522 formed by the first transistor device 526 and the second transistor device 528, may have a relatively high pass ratio compared to other, conventional current mirror stages.

In this exemplary embodiment, the third amplifier 505 is also an inverting transconductance stage, which functions similarly to that of the second amplifier 520. The output (drain terminal) of the third amplifier 505 is coupled to the gate terminal of a third transistor device 507 of a second current mirror stage 538 (e.g., indicated by the dashed lines including transistors M5-M7), and also to the gate terminal and drain terminal of a fourth transistor device 509 of the second current mirror stage 538. The drain terminal of the third transistor device 507 is coupled to the bias current input (source of M1, M2) of the first amplifier 502. Thus, the third amplifier 505 provides a bias current through the third and fourth transistor devices 507, 509 of the second current mirror stage 538 to the bias current input (source of M1, M2) of the first amplifier 502, and that bias current is proportional to the current supplied by the second amplifier 520 to the first transistor device 526 and second transistor device 528 of the first current mirror output stage 522. The proportional value is a design parameter that can be set by adjusting the transconductance value of the second amplifier 520 (e.g., by adjusting the size of transistor M5 relative to transistor M9) and the mirror ratio between the third transistor device 507 and the fourth transistor device 509 of the second current mirror stage 538. It should be noted that the transconductance value of transconductance amplifiers 520 and 505 may be different, and the size of the transistors of the second current mirror stage 538 can be much smaller than the size of the transistors of the first current mirror stage 522.

Notably, in the exemplary embodiment shown, the combination of the buffer amplifier 503 coupled between the output (drain terminal) of the second amplifier 520 and the gate terminals of the first and second transistor devices, 526, 528 functions to form a buffered, current mirror output stage 522. In other words, the buffer amplifier 503 functions, for example, as a buffer amplifier or voltage follower to drive the relatively large gate capacitance of the second transistor device 528 of the first current mirror output stage 522. Consequently, the buffer amplifier 503 is utilized to increase the overall bandwidth of the current mirror output stage 522 over that of other, non-buffered current mirror output stages (e.g., current mirror output stage 322 shown in FIG. 3).

In operation, referring to FIG. 5, two output conditions or states are considered when semiconductor structure 500 is implemented, for example, as an LDO voltage regulator: 1) the load current through the output terminal 532 ($V_{OUT}$) is steady (DC); and 2) the load current through the output terminal 532 ($V_{OUT}$) is suddenly increasing. For example, in the steady state of operation, semiconductor structure 500 essentially functions with three current mirror stages: 1) the current mirror pair formed by transistors 526 and 528; 2) the current mirror pair formed by transistors 520 and 505; and 3) the current mirror pair formed by transistors 509 and 507 (i.e., M5 and M9). These three current mirror stages generate and couple a tail current (through transistor 507) to the source terminals of differential transistor pair M1 and M2 (e.g., bias current input of first amplifier 502). The value of this tail current is typically designed to be a small fraction of the output current through transistor 528 of the first current mirror output stage 522 (hence the sizes of the transistors of the second current mirror stage 538 are typically a small fraction of the sizes of the transistors of the first current mirror stage 522). In the steady state of operation, the overall feedback loop of the semiconductor structure 500 is at equilibrium, and the feedback voltage, Vfb, at the node 506 is substantially equal to the reference voltage, Vref. As such, when the value of the output current is relatively small (e.g., steady state), transistor 501 generates a quiescent bias current for first amplifier 502 responsive to the value of the voltage (BIAS) applied to the gate of transistor 501, and the bias current generated by transistor 507 may be very small, even negligible.

In the second state of operation, the load current through the output terminal 532 ($V_{OUT}$) is suddenly increased. Before the overall feedback loop of the semiconductor structure 500 can react to this state change, the additional load current discharges the output capacitor 534 and thereby decreases the value of the output voltage, $V_{OUT}$. This decrease in the output voltage decreases the value of the feedback voltage, Vfb, at node 506, which is the voltage applied to the gate terminal of transistor M2 of first amplifier 502. The resulting decrease of the gate voltage of transistor M2 unbalances the input voltage to the differential pair, transistors M1 and M2, which increases the current flow through transistor M2, and thereby increases the voltage applied to the gates of transistors 505 and 520. The resulting increased drain current of transistor 505 is fed back through the current mirror pair of transistors 509 and 507 to the bias current input of the first amplifier 502, which in turn increases the value of the tail current being generated. This increase in the tail current increases the current through transistor M2, and thereby increases the voltage at the gate terminals of transistors 505 and 520 at a positive (increasing) rate. At the same time, the increased current through transistor 520 charges the large gate capacitance of the output transistor 528 (e.g., through the buffer amplifier 503), until the drain current of transistor 528 is more than sufficient to supply the load current. At this point, the magnitude of the output voltage, $V_{OUT}$, returns to a steady state as the added current charges the output capacitor 534. As such, the adaptive bias arrangement of the first amplifier 502 (input stage) increases the current level of the first stage above the equilibrium level of the overall feedback loop in order to charge the gate capacitance of output transistor 528 faster. As the resulting, new steady state condition is reached, the adaptive bias current reaches a new equilibrium value that is well-defined by the gate area (or width) ratios of the transistor pairs 528 and 526, 520 and 505, and 509 and 507.

In summary, in accordance with the teachings of the present application, the relatively large gate capacitance of the pass transistor 528 is outside the adaptive bias loop. The adaptive bias loop responds to the increased load current by increasing the value of the adaptive bias current to charge the gate capacitance of the pass transistor 528 faster. Since the gate capacitance of the pass transistor 528 is outside the adaptive bias loop, the response time of the adaptive bias loop is significantly faster than the response times of conventional bias loops in conventional LDO voltage regulators, and the resulting output voltage dips of an LDO voltage regulator implemented with the semiconductor structure 500 are significantly smaller than the output voltage dips of conventional LDO voltage regulators.

Notably, positive feedback is utilized in the exemplary embodiment of semiconductor structure 500. Thus, the resulting increase in the bias current produces a change in the operating point of the first amplifier 502, which in turn increases the adaptive bias current produced. In the exemplary embodiment depicted by semiconductor structure 500, the positive loop feedback gain is designed to be less than 1 to ensure the stability of the adaptive bias loop. For example, the transistor sizing is selected such that the adaptive feedback transistor 505 operates with a current density that is twice the current density of the transistors M3 and M4. Consequently, as a result of the decrease in the transconductance/drain current ratio (GM/Id) with current density, a loop gain of less than one is ensured.

Figure 6:
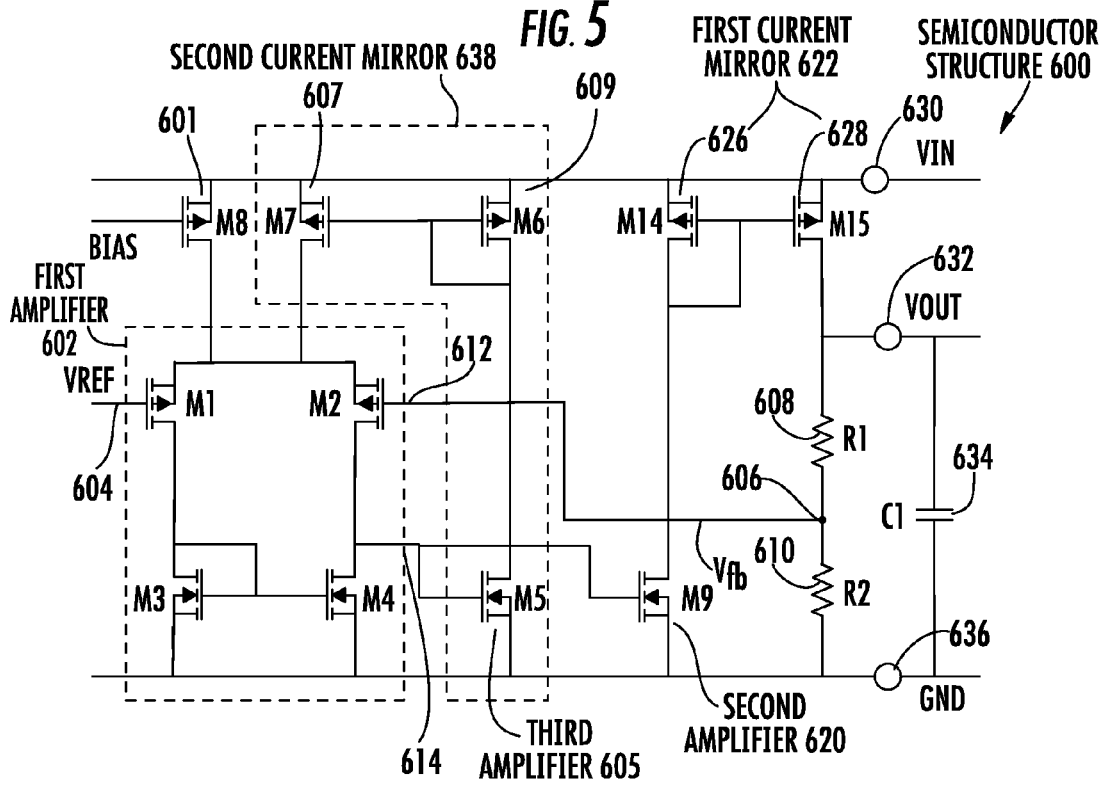
FIG. 6 is a schematic circuit diagram of an exemplary semiconductor structure, which can be utilized to implement the electronic circuit depicted in FIG. 1 or the electronic circuit depicted in FIG. 3.

FIG. 6 is a schematic circuit diagram of an exemplary semiconductor structure 600, which includes an electronic circuit that can be utilized to implement electronic circuit 100 or electronic circuit 300 shown in FIGS. 1 and 3 (e.g., as an adaptively-biased LDO voltage regulator for enhanced transient response). For example, semiconductor structure 600 can be a semiconductor IC, wafer, chip or die. Note that the structure and operation of semiconductor structure 600 is substantially similar to the structure and operation of semiconductor structure 500 shown in FIG. 5, but a buffer amplifier stage (e.g., 503 in FIG. 5) is not included in semiconductor structure 600.

Referring to the exemplary embodiment shown in FIG. 6 (and, for example, comparing the structure in FIG. 6 with the structures shown in FIGS. 1 and 3), semiconductor structure 600 includes a first amplifier 602 (e.g., indicated by the dashed lines including transistors M1-M4), which is an input stage that also functions as an error amplifier. In this exemplary embodiment, first amplifier 602 is a voltage gain amplifier with its current bias level controlled by its output voltage (e.g., self-biasing amplifier). A transistor 601 is coupled to the first amplifier 602, and responsive to an input voltage (e.g., BIAS) coupled to the gate terminal of the transistor 601, the transistor 601 generates a fixed bias current and thus provides a baseline bias current for the first amplifier 602, for example, at light load. In some embodiments, the input voltage (BIAS) is a fixed voltage generated within the semiconductor structure 600. In other embodiments, the input voltage (BIAS) is a variable reference voltage (e.g., varied by a digital to analog converter). In some embodiments, the input voltage (BIAS) is generated externally to the semiconductor structure 600 and coupled to the gate terminal of the transistor 601 through, for example, a pin of a semiconductor IC or chip.

A first input voltage (e.g., reference voltage or Vref) is coupled to the non-inverting input 604 (gate of transistor M1) of first amplifier 602. In some embodiments, the first input voltage is a fixed, reference voltage generated within the semiconductor structure 600. In other embodiments, the first input voltage is generated externally to the semiconductor structure 600 and coupled to the input 604, for example, through a pin of a semiconductor IC or chip. A second input voltage (e.g., feedback voltage or Vfb) is coupled from a node 606 connected to a first resistor 608 and a second resistor 610 (e.g., a resistive voltage divider) to the inverting input 612 (gate of transistor M2) of first amplifier 602. The output voltage of first amplifier 602 is coupled from the output 614 of the first amplifier 602 to the gate terminal (input) of a second amplifier 620 (transistor M9) and also to the gate terminal (input) of a third amplifier 605 (transistor M5).

In this exemplary embodiment, second amplifier 620 is an inverting transconductance amplifier, which develops the drive current for a first current mirror output stage 622. More precisely, the output (drain terminal) of the second amplifier 620 is coupled to the drain terminal of a first transistor device 626, and also to the gate terminals of the first transistor device 626 and a second transistor device 628 of the first current mirror output stage 622. The source terminals of the first transistor device 626 and second transistor device 628 are coupled to an input terminal 630 (e.g., $V_{IN}$) of the semiconductor structure 600. The drain terminal of the second transistor device 628 is coupled to one side (e.g., opposite to that of node 606) of the first resistor 508 and an output terminal 632 (e.g., $V_{OUT}$) of the semiconductor structure 600. One side of a capacitor 634 (e.g., output capacitor) is coupled to the output terminal 632, and the opposite side of the capacitor 634 is coupled to a ground terminal 636 (e.g., GND or circuit ground) of the semiconductor structure 600. The second side (e.g., opposite to that of node 606) of the second resistor 610 is also coupled to the ground terminal 636.

In this exemplary embodiment, the output current for semiconductor structure 600 is generated by the second transistor device 628 of the first current mirror output stage 622. The second transistor device 628 is typically a large pass transistor device with a total gate area or width that may be approximately 50 to 500 times larger than the total gate area or width of the first transistor device 626. In other words, the first current mirror output stage 622 formed by the first transistor device 626 and the second transistor device 628, may have a relatively high pass ratio compared to other, conventional current mirror stages.

In this exemplary embodiment, the third amplifier 605 is also an inverting transconductance stage, which functions similarly to that of the second amplifier 620. The output (drain terminal) of the third amplifier 605 is coupled to the gate terminal of a third transistor device 607 of a second current mirror stage 638 (e.g., indicated by the dashed lines including transistors M5-M7), and also to the gate terminal and drain terminal of a fourth transistor device 609 of the second current mirror stage 638. The drain terminal of the third transistor device 607 is coupled to the bias current input (the source of M1, M2) of the first amplifier 602. Thus, the third amplifier 605 provides a bias current through the third and fourth transistor devices 607, 609 of the second current mirror stage 638 to the bias current input (source of M1, M2) of the first amplifier 602, and that bias current is proportional to the current supplied by the second amplifier 620 to the first transistor device 626 and second transistor device 628 of the first current mirror output stage 622. The proportional value is a design parameter that can be set by adjusting the transconductance value of the second amplifier 620 and the mirror ratio between the third transistor device 607 and the fourth transistor device 609 of the second current mirror stage 638.

In operation, referring to FIG. 6, two output conditions or states are considered when semiconductor structure 600 is implemented, for example, as an LDO voltage regulator: 1) the load current through the output terminal 632 ($V_{OUT}$) is steady (DC); and 2) the load current through the output terminal 632 ($V_{OUT}$) is suddenly increasing. For example, in the steady state of operation, semiconductor structure 600 essentially functions with three current mirror stages: 1) the current mirror pair formed by transistors 626 and 628; 2) the current mirror pair formed by transistors 620 and 605; and 3) the current mirror pair formed by transistors 609 and 607 (M5 and M9). These three current mirror stages generate and couple a tail current (through transistor 607) to the differential transistor pair M1 and M2 (e.g., bias current input of first amplifier 602). The value of this tail current is designed to be a small fraction of the output current through transistor 628 of the first current mirror output stage 622. In the steady state of operation, the overall feedback loop of the semiconductor structure 600 is at equilibrium, and the feedback voltage, Vfb, at the node 606 is substantially equal to the reference voltage, Vref. As such, when the value of the output current is relatively small (e.g., steady state), transistor 601 generates a quiescent bias current for first amplifier 602 responsive to the value of the voltage (BIAS) applied to the gate of transistor 601, and the bias current generated by transistor 607 may be very small, even negligible.

In the second state of operation, the load current through the output terminal 632 ($V_{OUT}$) is suddenly increased. Before the overall feedback loop of the semiconductor structure 600 can react to this state change, the additional load current discharges the output capacitor 634 and thereby decreases the value of the output voltage, $V_{OUT}$. This decrease in the output voltage decreases the value of the feedback voltage, Vfb, at node 606, which is the voltage applied to the gate terminal of transistor M2 of first amplifier 602. The resulting decrease of the gate voltage of transistor M2 unbalances the input voltage to the differential pair, transistors M1 and M2, which increases the current flow through transistor M2, and thereby increases the voltage applied to the gates of transistors 605 and 620. The resulting increased drain current of transistor 605 is fed back through the current mirror pair of transistors 609 and 607 to the bias current input of the first amplifier 602, which in turn increases the value of the tail current being generated. This increase in the tail current increases the current through transistor M2, and thereby increases the voltage at the gate terminals of transistors 605 and 620 at a positive (increasing) rate. At the same time, the increased current through transistor 620 charges the large gate capacitance of the output transistor 628 faster, until the drain current of transistor 628 is more than sufficient to supply the load current. At this point, the magnitude of the output voltage, $V_{OUT}$, returns to a steady state as the added current charges the output capacitor 634. As such, the adaptive bias arrangement of the first amplifier 602 (input stage) increases the current level of the first stage above the equilibrium level of the overall feedback loop in order to charge the gate capacitance of output transistor 628. As the resulting, new steady state condition is reached, the adaptive bias current reaches a new equilibrium value that is well-defined by the gate area ratios of the transistor pairs 628 and 626, 620 and 605, and 609 and 607.

In summary, in accordance with the teachings of the present application, the relatively large gate capacitance of the pass transistor 628 is outside the adaptive bias loop. The adaptive bias loop responds to the increased load current by increasing the value of the adaptive bias current to charge the gate capacitance of the pass transistor 628 faster. Since the gate capacitance of the pass transistor 628 is outside the adaptive bias loop, the response time of the adaptive bias loop is significantly faster than the response times of conventional bias loops in conventional LDO voltage regulators, and the resulting output voltage dips of an LDO voltage regulator implemented with the semiconductor structure 600 are significantly smaller than the output voltage dips of conventional LDO voltage regulators.

Notably, positive feedback is utilized in the exemplary embodiment of semiconductor structure 600. Thus, the resulting increase in the bias current produces a change in the operating point of the first amplifier 602, which in turn increases the adaptive bias current produced. In the exemplary embodiment depicted by semiconductor structure 600, the positive feedback loop gain is designed to be less than 1 to ensure the stability of the adaptive bias loop. For example, the transistor sizing is selected such that the adaptive feedback transistor 605 operates with a current density that is twice the current density of the transistors M3 and M4. Consequently, as a result of the decrease in the transconductance/drain current ratio (GM/Id) with current density, a loop gain of less than one is ensured.

Figures 7A, 7B:
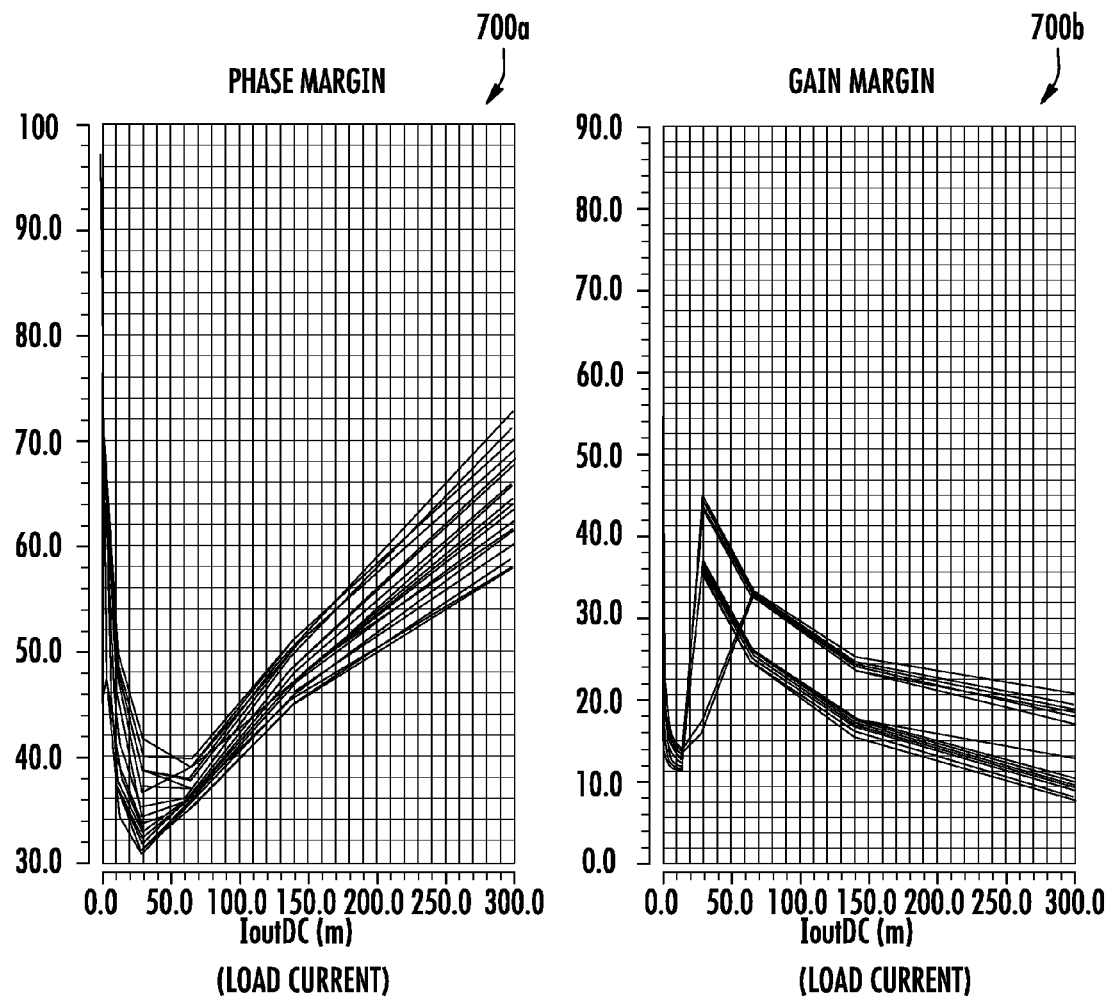
FIGS. 7A and 7B are related graphs showing simulated phase margin performance curves and gain margin performance curves for LDO voltage regulators structured in accordance with embodiments of the present invention.

FIGS. 7A and 7B are related graphs showing simulated phase margin performance curves and gain margin performance curves, respectively, for adaptively-biased LDO voltage regulators structured in accordance with one or more of the above-described embodiments of the present invention. These graphs depict simulated performance curves for the adaptively-biased LDO voltage regulators with different supply voltages, temperatures and process corners applied. The horizontal (X) axes indicate load currents applied, and the vertical (Y) axes indicate phase margin values or gain margin values for the different operating conditions and different output current levels for the LDO voltage regulator simulations involved.

Notably, as the graphs 700a and 700b indicate, considerable design attention is paid to the provision of an acceptable level of circuit stability over all of the potential operating conditions and output current levels that might be encountered. However, this level of stability typically involves significant trade-offs with quiescent current levels. Nevertheless, as indicated by the LDO regulator performance characteristics shown in FIGS. 7A and 7B, these simulation results substantiate that the above-described embodiments of the present invention can be utilized to implement LDO voltage regulators that achieve acceptable levels of circuit stability for both small and large signals. In other words, as demonstrated by graphs 700a and 700b, the overall performance of the LDO voltage regulators involved are substantially similar for all of the different operating conditions (e.g., supply voltages, temperatures, process corners) and output current levels applied.

Figure 8:
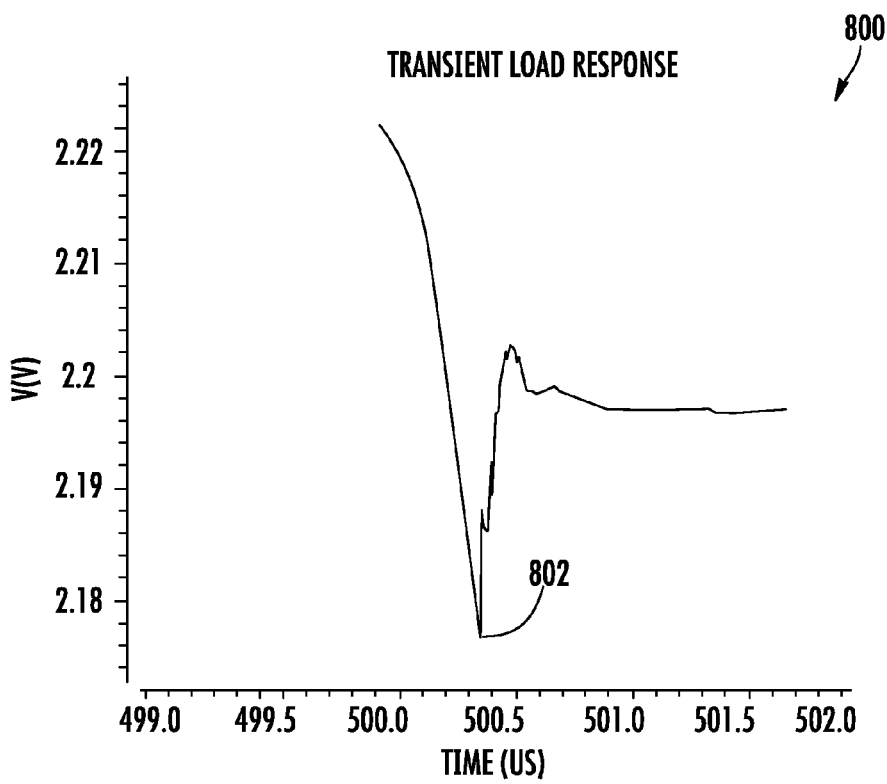
FIG. 8 is a graph that shows a simulated transient load response for an adaptive bias LDO voltage regulator structured in accordance with embodiments of the present invention.
Figure 9:
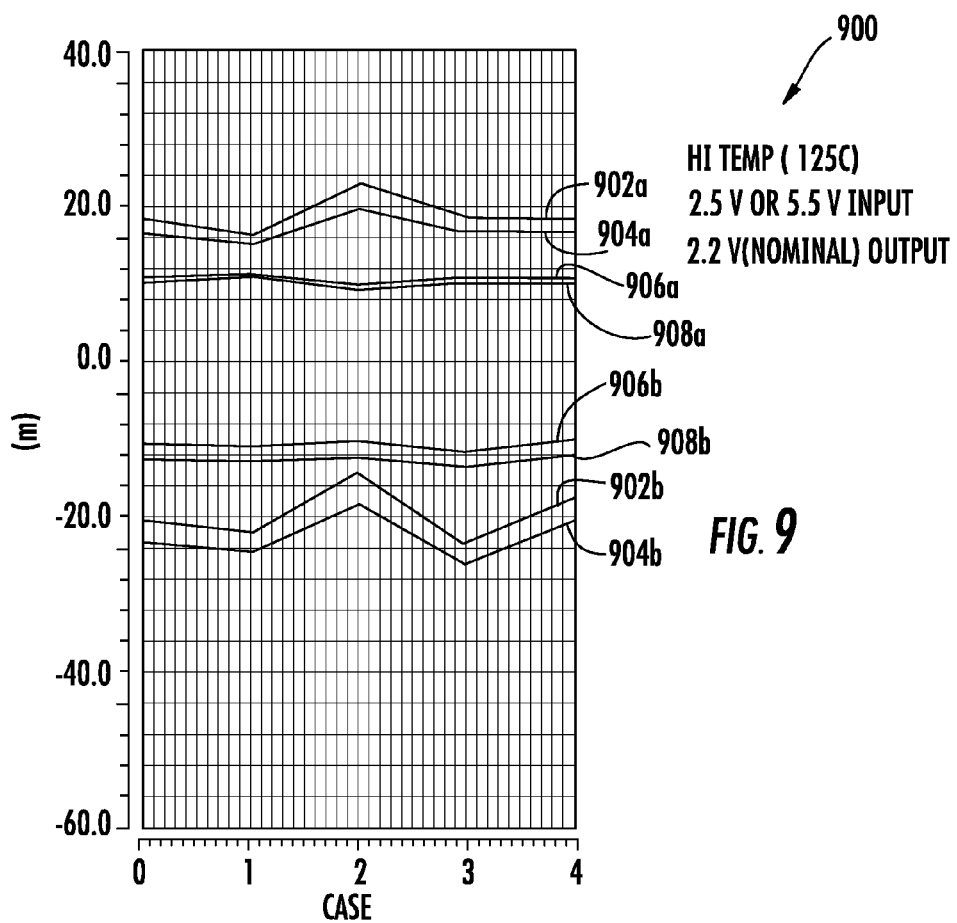
FIG. 9 is a graph that shows performance patterns under simulated operating conditions of an LDO voltage regulator, in accordance with embodiments of the present invention.

FIG. 8 is a graph that depicts a simulated transient load response for an adaptively-biased LDO voltage regulator structured in accordance with the above-described teachings of the present application. For the simulation shown, a 300 mA load current step is applied to the adaptively-biased LDO voltage regulator at 500 µs. Notably, FIG. 8 demonstrates that an improvement in transient voltage dip performance over that of conventional LDO voltage regulators is produced primarily from the increased speed of response over that of conventional LDO voltage regulators. For example, as shown in FIG. 8, the output voltage of the simulated LDO voltage regulator "dips" to approximately 2.176V (802) at about 500.45 µs. In notable contrast, the output voltages of conventional LDO voltage regulators will dip to at least 2.142V at 500.5 µs or later in time. As such, the enhanced transient response of the adaptively-biased LDO voltage regulator compared to conventional LDO voltage regulators is achieved primarily as follows. Somewhat similarly to conventional LDO voltage regulators, the output voltage of the adaptively-biased LDO voltage regulator is decreased as the increased load functions to discharge the output capacitor. Nevertheless, the adaptively-biased LDO voltage regulator increases its bias current in order to be able to charge the gate capacitance of the pass transistor device faster. The transient response time of the adaptive bias feedback loop is much shorter than that of the overall feedback loop of the LDO voltage regulator, and therefore, the adaptively-biased LDO voltage regulator responds more quickly to load transients than conventional LDO voltage regulators that do not have adaptive bias feedback loops, as well as than conventional LDO voltage regulators with adaptive bias feedback where the adaptive bias feedback loop includes the input capacitance of the typically large output device. Also, the transient dips experienced by the adaptively-biased LDO voltage regulator are significantly smaller than the transient dips experienced by conventional LDO voltage regulators. FIG. 9 is a graph that depicts simulated performance patterns of an adaptively-biased LDO voltage regulator under the simulated operating conditions of a high operating temperature (125 C), an input voltage of 2.5V (e.g., $V_{IN}$), and a nominal output voltage of 2.2V (e.g., $V_{OUT}$). As demonstrated by FIG. 9, although the simulations are conducted over a wide variety of different process, temperature and input voltage conditions, the performance patterns of the adaptively-biased LDO voltage regulator are substantially maintained. In other words, the graph depicted in FIG. 9 shows what little impact manufacturing variations (m) have on the performance of the adaptively-biased LDO voltage regulator. As such, the performance variations depicted in FIG. 9 result primarily from changes in operating temperature. For example, the upper curves 902a-908a shown in FIG. 9 depict the maximum voltage error or transient overshoot of the adaptively-biased LDO voltage regulator, and the lower curves 902b-908b depict the minimum voltage or transient dip of the adaptively-biased LDO voltage regulator involved. The horizontal (X) axis indicates the process corners utilized in this simulation for the following five manufacturing cases: Case 0 indicates the process corners utilized for typical n-channel metal-oxide semiconductor (NMOS) and p-channel (PMOS) transistors; Case 1 indicates the process corners utilized for slow NMOS and PMOS transistors; Case 2 indicates the process corners utilized for fast NMOS and PMOS transistors; Case 3 indicates the process corners utilized for slow NMOS transistors and fast PMOS transistors; and Case 4 indicates the process corners utilized for fast NMOS transistors and slow PMOS transistors. In this illustrative simulation, the performance curves 902a and 902b indicate circuit performance for an input voltage of 2.5V and an operating temperature of 125 C, curves 904a and 904b indicate circuit performance for an input voltage of 5.5V and an operating temperature of 125 C, curves 906a and 906b indicate circuit performance for an input voltage of 5.5V and an operating temperature of −20 C, and curves 908a and 908b indicate circuit performance for an input voltage of 2.5V and an operating temperature of −20 C. An output voltage of 2.2V (nominal) is utilized for all simulations. Notably, the simulations shown in FIG. 9 indicate the enhanced transient overshoot and dip performance of the above-described adaptively-biased LDO voltage regulator over the transient overshoot and dip performance of conventional LDO voltage regulators.

Figure 10:
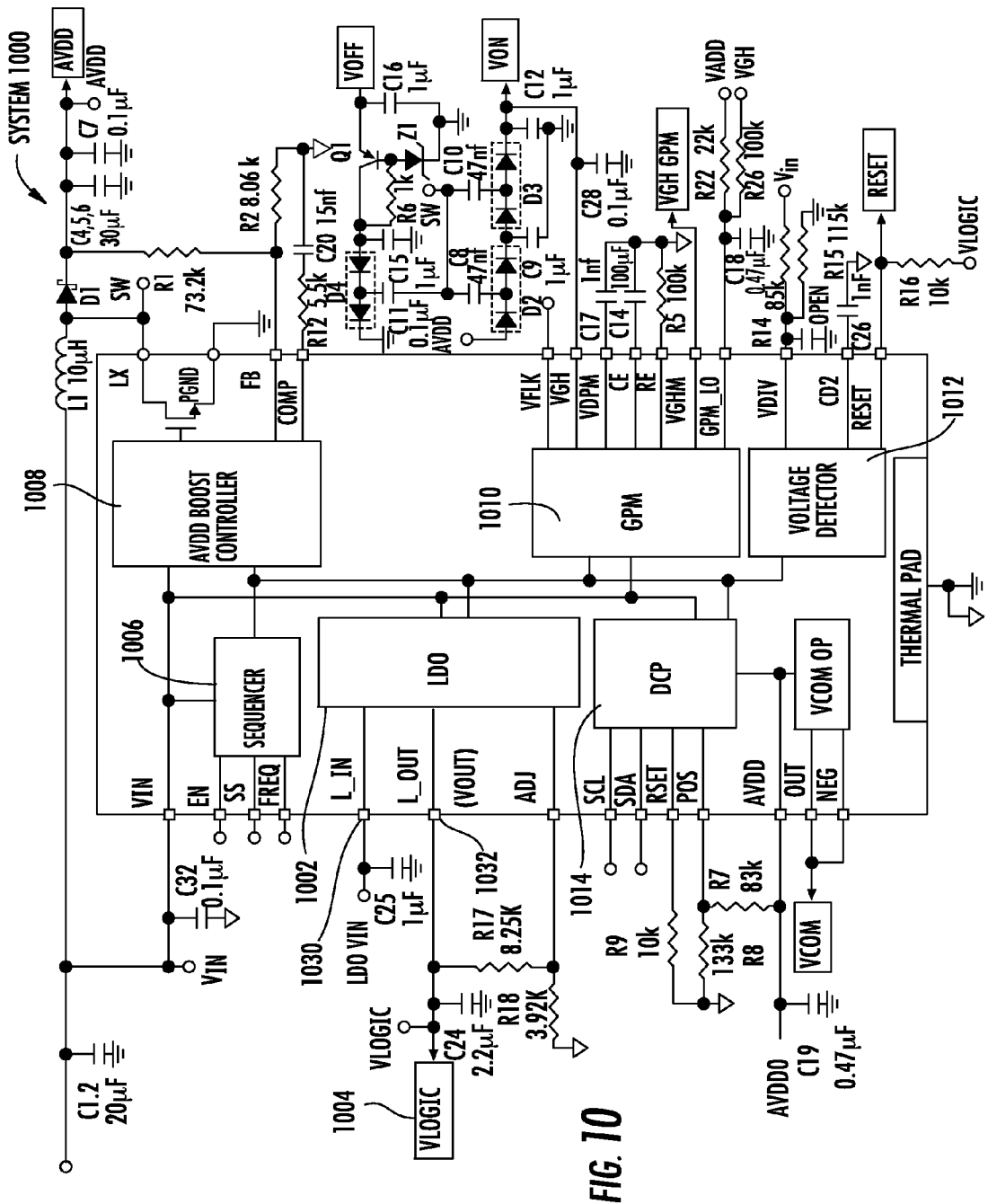
FIG. 10 is a schematic, block diagram of an exemplary system configured as a power management integrated circuit (PMIC) that can be utilized to implement a semiconductor structure for enhanced transient response, in accordance with one or more embodiments of the present invention.

FIG. 10 depicts a schematic, block diagram of an exemplary system 1000 configured as a PMIC that can be utilized to implement a semiconductor structure for enhanced transient response, in accordance with one or more embodiments of the present invention. In some embodiments, system 1000 can be implemented on a semiconductor IC, chip, wafer or die. In the exemplary embodiment shown, system 1000 can be implemented as an integrated PMIC to provide, for example, power for thin-film-transistor liquid crystal displays (TFT-LCDs) in notebooks, tablet personal computers (PCs), monitors, and also TFT-LCDs for small size displays, such as smart phone displays. Referring to FIG. 10 for one exemplary embodiment, system 1000 includes an adaptively-biased LDO voltage regulator 1002 configured in accordance with one or more of the above-described embodiments depicted in FIGS. 1-6. The adaptively-biased LDO voltage regulator 1002 is coupled to a voltage input connection 1030 to receive an input voltage ($V_{IN}$), and a voltage output connection 1032 to output a regulated voltage ($V_{OUT}$) to a VLOGIC channel output connection 1004. The regulated output voltage from the adaptively-biased LDO voltage regulator 1002 is a relatively low voltage utilized to drive external digital circuitry coupled to the VLOGIC channel output 1004. The LDO regulator 1002 is also utilized to provide a regulated voltage to a sequencer 1006, an analog Vdd or supply voltage (AVDD) boost controller 1008, a gate pulse modulator (GPM) 1010, a voltage detector 1012, and a digitally-controlled potentiometer (DCP) 1014 utilized as a calibrator to adjust the $V_{COM}$ voltage of the LCD utilized. In this exemplary system, the LDO voltage regulator 1002 is an externally adjustable component (e.g., via a contact pin of a semiconductor IC or chip), and is exposed as a "stand alone" function. In other exemplary systems, the LDO voltage regulator 1002 is not externally adjustable. As such, in accordance with the above-described teachings of the present application, the adaptively-biased LDO voltage regulator 1002 provides an enhanced (e.g., substantially faster) transient response in system 1000 over the transient responses of conventional LDO voltage regulators.

Figure 11:
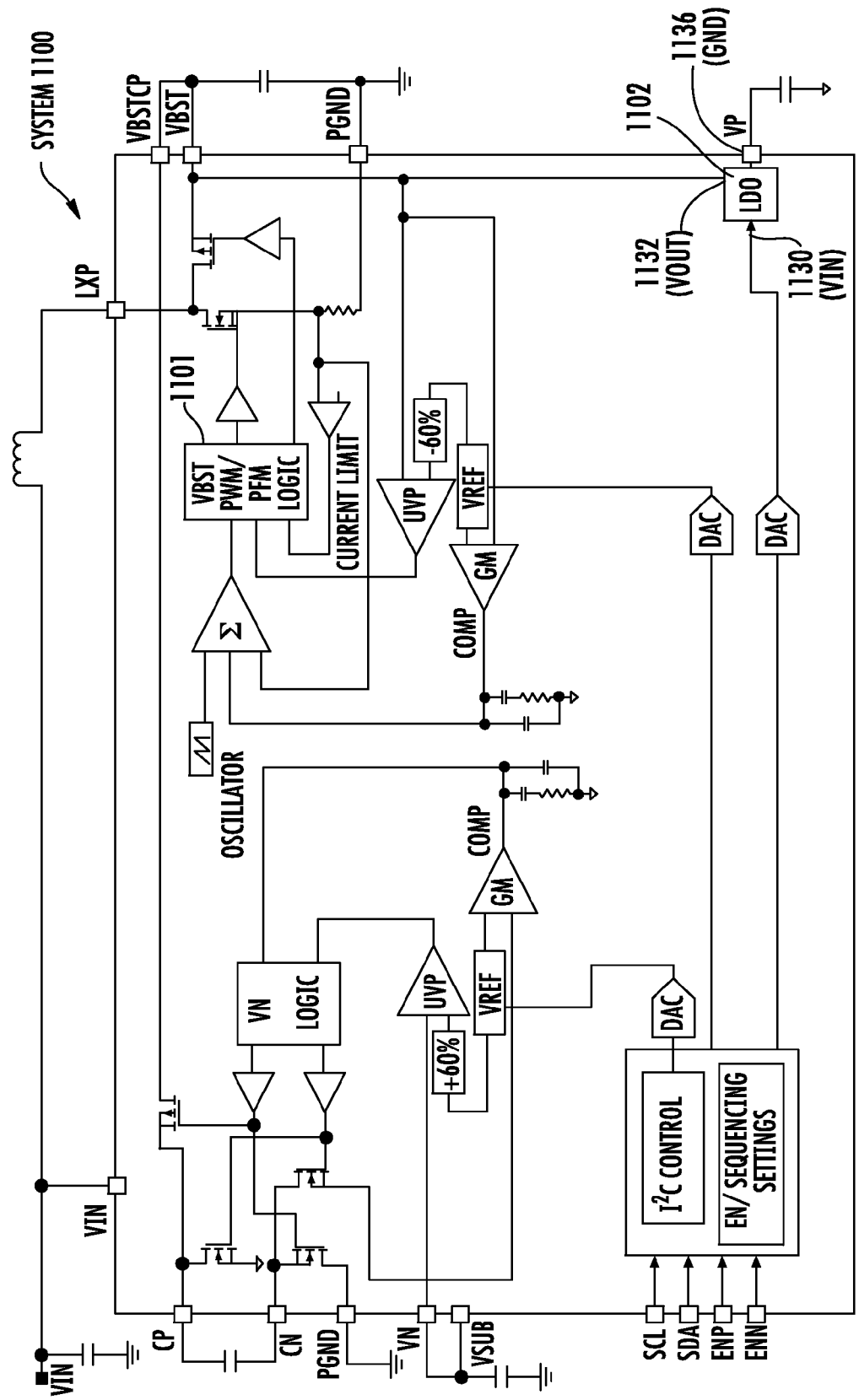
FIG. 11 is a schematic, block diagram of an exemplary system configured as a PMIC that can be utilized to implement a semiconductor structure for enhanced transient response, in accordance with one or more embodiments of the present invention.

FIG. 11 depicts a schematic, block diagram of a second exemplary system 1100 configured as a PMIC that can be utilized to implement a semiconductor structure for enhanced transient response, in accordance with one or more embodiments of the present invention. In some embodiments, system 1100 can be implemented on a semiconductor IC, chip, wafer or die. In the exemplary embodiment shown, system 1100 is implemented as a high efficiency power supply for small-sized, hand-held displays such as, for example, smart phone TFT-LCDs. Referring to FIG. 11 for one exemplary embodiment, system 1100 includes an adaptively-biased LDO voltage regulator 1102 configured in accordance with one or more of the above-described embodiments depicted in FIGS. 1-6. The adaptively-biased LDO voltage regulator 1102 is coupled between circuit ground 1136 and numerous other circuit components of system 1100, in order to provide suitable decoupling for power supply circuitry in system 1100. As such, in some exemplary embodiments, the adaptively-biased LDO voltage regulator 1102 is integrated with an "on-chip" voltage adjustment to enable post-fabrication voltage adjustments of the adaptively-biased LDO voltage regulator 1102. Essentially, in operation, the voltage at the input 1130 ($V_{IN}$) of the adaptively-biased LDO voltage regulator 1102 is provided from a boost converter 1101, which is adapted to track the voltage at the output 1132 ($V_{OUT}$) of the adaptively-biased LDO voltage regulator 1102, in order to provide just enough of a voltage drop for the adaptively-biased LDO voltage regulator 1102 to function as desired. As such, in accordance with the teachings of the present application, the adaptively-biased LDO voltage regulator 1102 provides an enhanced (e.g., faster) transient response in system 1100 over the transient responses of conventional LDO voltage regulators.

Figure 12:
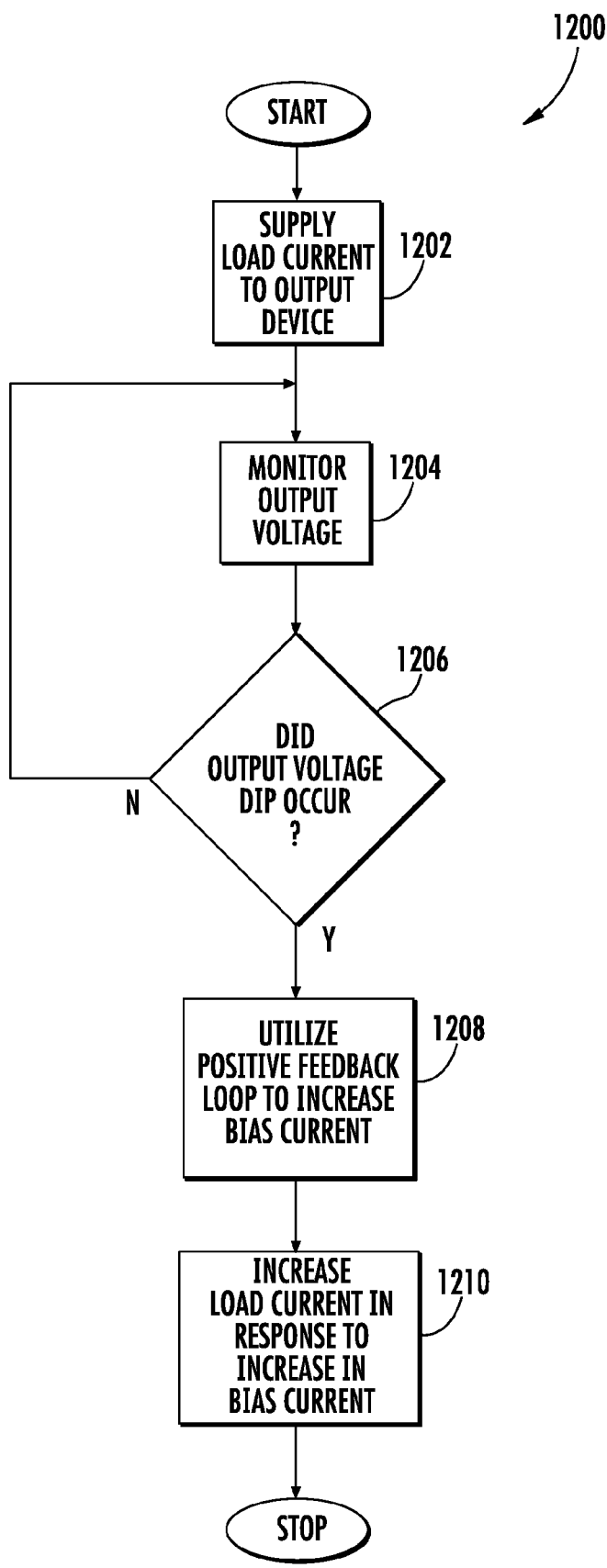
FIG. 12 is a flow chart depicting an exemplary method of operation of an adaptively-based LDO voltage regulator, in accordance with one or more embodiments of the present invention.

FIG. 12 is a flow chart depicting an exemplary method of operation 1200 of an adaptively-based LDO voltage regulator, in accordance with one or more embodiments of the present invention. For example, method 1200 can be utilized to describe an operation for one or more of the exemplary embodiments depicted in FIGS. 1 through 6. Referring to FIG. 12 for one exemplary embodiment, a first amplifier (e.g., error amplifier) outputs a suitable voltage that is converted (e.g., by a transconductance amplifier) to a load current utilized to control an output device (e.g., pass transistor) of the adaptively-biased LDO voltage regulator (1202). The first amplifier also receives a feedback voltage representing the output voltage of the adaptively-biased LDO voltage regulator (1204). If a dip in the feedback voltage (e.g., decrease in the output voltage associated with a transient in the load current) received by the first amplifier occurs (1206), the first amplifier utilizes a positive feedback loop to increase its own bias current in response to the output voltage dip (1208). Notably, the positive feedback loop does not include the capacitance associated with the control terminal of the output device (e.g., gate capacitance of pass or output transistor). In response to the increase in the bias current, the first amplifier increases its output voltage and (e.g., via a transconductance amplifier) thereby increases the load current to the output device (1210). However, if (1206) a dip in the feedback voltage has not occurred, the flow returns to monitor the output voltage (1204).

In the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment.

Terms of relative position as used in this application are defined based on a plane parallel to the conventional plane or working surface of a wafer or substrate, regardless of the orientation of the wafer or substrate. The term "horizontal" or "lateral" as used in this application is defined as a plane parallel to the conventional plane or working surface of a wafer or substrate, regardless of the orientation of the wafer or substrate. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the wafer or substrate, regardless of the orientation of the wafer or substrate.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that the present invention be limited only by the claims and the equivalents thereof.

What is claimed is:

1. A semiconductor structure, comprising:
    a first current mirror circuit, the first current mirror circuit coupled to an input connection and an output connection of the semiconductor structure;
    a second current mirror circuit, the second current mirror circuit coupled to the input connection of the semiconductor structure;
    a first amplifier circuit, a first input of the first amplifier circuit coupled to the second current mirror circuit, a second input of the first amplifier circuit coupled to the output connection of the semiconductor structure, and a third input of the first amplifier circuit coupled to a reference voltage;
    a second amplifier circuit, an input of the second amplifier circuit coupled to an output of the first amplifier circuit, and an output of the second amplifier circuit coupled to the first current mirror circuit; and
    a third amplifier circuit, an input of the third amplifier circuit coupled to the output of the first amplifier circuit, and an output of the third amplifier circuit coupled to the second current mirror circuit.

2. The semiconductor structure of claim 1, further comprising:
    a fourth amplifier circuit connected between the output of the second amplifier circuit and the first current mirror circuit.

3. The semiconductor structure of claim 1, wherein the reference voltage is a fixed voltage.

4. The semiconductor structure of claim 1, wherein the second input of the first amplifier circuit is adapted to receive a feedback voltage proportional to an output voltage of the semiconductor structure.

5. The semiconductor structure of claim 1, wherein the first input of the first amplifier circuit comprises a bias current input.

6. The semiconductor structure of claim 1, wherein the first amplifier circuit comprises an error amplifier, the second amplifier circuit comprises a transconductance amplifier; and the third amplifier circuit comprises a transconductance amplifier.

7. The semiconductor structure of claim 2, wherein the fourth amplifier circuit comprises a buffer amplifier.

8. The semiconductor structure of claim 1, wherein the semiconductor structure comprises an adaptively-biased low dropout (LDO) voltage regulator on a semiconductor integrated circuit (IC), wafer, chip or die.

9. The semiconductor structure of claim 1, wherein the first input of the first amplifier circuit is connected to a drain terminal of a first transistor device of the second current mirror circuit, and the first amplifier circuit thereby comprises a self-biasing amplifier circuit.

10. An electronic circuit, comprising:
    a first transistor device coupled to an input connection and an output connection of the electronic circuit;
    a second transistor device coupled to the first transistor device and the input connection of the electronic circuit, wherein the first transistor device and the second transistor device comprise a first current mirror stage, and the first transistor device comprises an output transistor of the electronic circuit;
    a third transistor device coupled to the input connection of the electronic circuit;
    a fourth transistor device coupled to the input connection of the electronic circuit and the third transistor device, wherein the third transistor device and the fourth transistor device comprise a second current mirror stage;
    an error amplifier coupled to the first transistor device and the second transistor device via a first transconductance amplifier, and to the third transistor device and the fourth transistor device via a second transconductance amplifier, and a bias current input of the error amplifier coupled to a drain terminal of the fourth transistor device, wherein the error amplifier is adapted to compare a reference voltage to a feedback voltage proportional to an output voltage of the electronic circuit, and couple a current signal to the first current mirror stage and the second current mirror stage to drive the first current mirror stage and the second current mirror stage.

11. The electronic circuit of claim 10, further comprising a voltage follower connected between the first transconductance amplifier and the first current mirror stage.

12. The electronic circuit of claim 10, wherein the electronic circuit comprises an adaptively-biased LDO voltage regulator.

13. The electronic circuit of claim 10, wherein the electronic circuit comprises all or part of an IC power supply or a power management IC (PMIC).

14. A method of operation of an adaptively-biased LDO voltage regulator, comprising:
   a first amplifier receiving a feedback voltage associated with an output voltage of the adaptively-biased LDO voltage regulator;
   the first amplifier comparing the feedback voltage to a reference voltage and generating a first voltage responsive to the comparing;
   responsive to the first voltage, a first transconductance amplifier generating a first output current and a second transconductance amplifier generating a second output current;
   responsive to the second output current, generating a bias current for the first amplifier; and
   responsive to the first output current, generating an output current of the adaptively-biased LDO voltage regulator.

15. The method of claim 14, wherein the first amplifier is an error amplifier circuit.

16. The method of claim 14, wherein the generating the bias current for the first amplifier comprises coupling an output of the second transconductance amplifier to an input of a current mirror circuit, and
   coupling an output of the current mirror circuit to a bias current input of the first amplifier.

17. The method of claim 14, wherein the generating the output current of the adaptively-biased LDO voltage regulator comprises coupling an output of the first transconductance amplifier to an input of a current mirror circuit including an output transistor of the adaptively-biased LDO voltage regulator.

18. The method of claim 17, wherein the coupling the output of the first transconductance amplifier to the input of the current mirror circuit including the output transistor of the adaptively-biased LDO voltage regulator further comprises:
   coupling the output of the first transconductance amplifier to an input of a buffer amplifier circuit; and
   coupling an output of the buffer amplifier circuit to the input of the current mirror circuit.

19. The method of claim 14, wherein the method is performed in an adaptively-biased LDO voltage regulator of an IC power supply or a PMIC.

20. A system, comprising:
   a sequencer unit;
   an analog supply voltage (AVDD) boost controller;
   a gate pulse modulator (GPM);
   a voltage detector;
   a digitally-controlled potentiometer (DCP); and
   an adaptively-biased LDO voltage regulator coupled to one or more of the sequencer unit, AVDD boost controller, GPM, voltage detector, and DCP, wherein the adaptively-biased LDO voltage regulator comprises:
   a first current mirror circuit, the first current mirror circuit coupled to an input connection and an output connection of the adaptively-biased LDO voltage regulator;
   a second current mirror circuit, the second current mirror circuit coupled to the input connection of the adaptively-biased LDO voltage regulator;
   a first amplifier circuit, a first input of the first amplifier circuit coupled to the second current mirror circuit, a second input of the first amplifier circuit coupled to the output connection of the adaptively-biased LDO voltage regulator, and a third input of the first amplifier circuit coupled to a reference voltage;
   a second amplifier circuit, an input of the second amplifier circuit coupled to an output of the first amplifier circuit, and an output of the second amplifier circuit coupled to the first current mirror circuit; and
   a third amplifier circuit, an input of the third amplifier circuit coupled to the output of the first amplifier circuit, and an output of the third amplifier circuit coupled to the second current mirror circuit.

21. The system of claim 20, wherein the system comprises a power supply formed on a semiconductor wafer, chip, IC or die.

22. A system, comprising:
   a power supply for a thin-film-transistor liquid crystal display (TFT-LCD); and
   an adaptively-biased LDO voltage regulator for decoupling or bypassing to circuit ground one or more frequency signals generated by one or more components of the power supply, the adaptively-biased LDO voltage regulator comprising:
   a first current mirror circuit, the first current mirror circuit coupled to an input connection and an output connection of the adaptively-biased LDO voltage regulator;
   a second current mirror circuit, the second current mirror circuit coupled to the input connection of the adaptively-biased LDO voltage regulator;
   a first amplifier circuit, a first input of the first amplifier circuit coupled to the second current mirror circuit, a second input of the first amplifier circuit coupled to the output connection of the adaptively-biased LDO voltage regulator, and a third input of the first amplifier circuit coupled to a reference voltage;
   a second amplifier circuit, an input of the second amplifier circuit coupled to an output of the first amplifier circuit, and an output of the second amplifier circuit coupled to the first current mirror circuit; and
   a third amplifier circuit, an input of the third amplifier circuit coupled to the output of the first amplifier circuit, and an output of the third amplifier circuit coupled to the second current mirror circuit.

23. The system of claim 22, wherein the system comprises a PMIC or a power supply formed on a semiconductor wafer, chip, IC or die.

24. An LDO voltage regulator, comprising:
   an output terminal;
   an output device coupled to the output terminal, the output device adapted to supply a load current for the LDO voltage regulator; and
   an error amplifier circuit including a positive feedback loop, the error amplifier circuit coupled to the output terminal, a reference voltage, and a control terminal of the output device, the positive feedback loop excluding a capacitance associated with the control terminal of the output device, wherein the error amplifier circuit is adapted to compare the reference voltage with a voltage associated with an output voltage on the output terminal, and utilize the positive feedback loop to increase a bias current of the error amplifier circuit if a dip in the output voltage associated with a transient in the load current occurs, wherein the output device is an output transistor of a current mirror circuit.

25. The LDO voltage regulator of claim 24, further comprising:
   a transconductance amplifier coupled to an output of the error amplifier circuit and the control terminal of the output device.

26. The LDO voltage regulator of claim 24, wherein the positive feedback loop includes a transconductance amplifier coupled to an output of the error amplifier circuit, an output of the transconductance amplifier coupled to a second current mirror circuit, and the second current mirror circuit coupled to a bias input of the error amplifier circuit.

27. The LDO voltage regulator of claim 24, further comprising a buffer amplifier coupled between an output of the error amplifier circuit and the control terminal of the output device.

28. A method of operation of an LDO voltage regulator, comprising:
 supplying a load current through an output terminal of the LDO voltage regulator, wherein the supplying is performed by a current mirror output circuit;
 monitoring an output voltage on the output terminal of the LDO voltage regulator;
 determining if a dip in the output voltage associated with a transient in the load current has occurred, and
 if a dip in the output voltage associated with a transient in the load current has occurred, utilizing a positive feedback loop to increase a current to a control terminal of an output device of the LDO voltage regulator, wherein the positive feedback loop excludes a capacitance associated with the control terminal of the output device.

29. The method of claim 28, wherein the positive feedback loop includes a transconductance amplifier and a current mirror circuit.

30. The method of claim 28, wherein the monitoring and determining are performed by an error amplifier circuit, and the output device comprises a pass transistor.

31. The method of claim 28, wherein the utilizing the positive feedback loop is performed by an error amplifier circuit to increase a bias current of the error amplifier circuit.

* * * * *